United States Patent [19]

Kreft et al.

[11] 4,132,503
[45] Jan. 2, 1979

[54] VARIABLE-PITCH PROPELLER

[75] Inventors: Robert Kreft, Stockelsdorf; Udo Törper, Lübeck, both of Fed. Rep. of Germany

[73] Assignee: Schaffran Propeller Lehne & Co., Lübeck, Fed. Rep. of Germany

[21] Appl. No.: 781,081

[22] Filed: Mar. 25, 1977

[30] Foreign Application Priority Data

Mar. 27, 1976 [DE] Fed. Rep. of Germany ....... 2613225

[51] Int. Cl.² ............................................. B63H 3/04
[52] U.S. Cl. ................................ 416/167; 416/157 R; 416/168 R
[58] Field of Search ................... 416/168, 168 A, 167, 416/157 R

[56] References Cited

U.S. PATENT DOCUMENTS

| 2,660,461 | 11/1953 | Corby | 416/168 A X |
| 3,844,681 | 10/1974 | Kolesnikov et al. | 416/168 A X |
| 3,920,353 | 11/1975 | Bredsted | 416/168 A |

FOREIGN PATENT DOCUMENTS

| 833630 | 3/1952 | Fed. Rep. of Germany | 416/168 A |
| 1014451 | 8/1952 | France | 416/168 A |
| 36003 | 11/1971 | Japan | 416/167 |
| 424678 | 5/1967 | Switzerland | 416/168 A |
| 578570 | 7/1946 | United Kingdom | 416/168 |

*Primary Examiner*—Everette A. Powell, Jr.
*Attorney, Agent, or Firm*—Michael J. Striker

[57] ABSTRACT

A variable-pitch propeller has a hollow hub rotatable about a hub axis and carrying a plurality of angularly equispaced vanes each rotatable on the hub about a respective vane axis extending radially of the hub axis. Each of the vanes has an eccentric pivot pin parallel to its respective vane axis and connected via a bearing to one end of an arm formed on an adjustment member displaceable in the hub along the hub axis and rotatable in the hub about the hub axis. The bearing allows for rotation of the pivot pin relative to the arm in which it is received and for displacement of the pivot pin along the pivot axis relative to the arm receiving it. Thus axial displacement of the adjustment member will force the pivot pins to orbit limitedly about the respective vane axes with concomitant sliding of the bearing along the pin and simultaneous rotation of the adjustment member in the hub.

14 Claims, 2 Drawing Figures

VARIABLE-PITCH PROPELLER

BACKGROUND OF THE INVENTION

The present invention relates to a variable-pitch propeller. More particularly this invention concerns such a propeller having a plurality of vanes rotatable on the propeller hub.

A variable-pitch propeller has a plurality of vanes each rotatable about a respective vane axis that extends radially of the rotation axis for the propeller hub. Such a propeller can be used in a compressor or fan, on a water-going vessel as the drive screw, or even on an aircraft. As the vanes are rotated so that the angles they form with the hub axis become smaller the fluid throughput increases and vice versa.

This variation in pitch is normally obtained by providing on each of the vanes an eccentric crank pin which is connected to an adjustment member that is displaceable along the hub axis. Complex linkages comprising pivotable crank arms or coulisse-guided slide-blocks are provided between each of these crank pins and the adjustment member so that a displacement of the adjustment member along the hub axis will pivot the vanes about the vane axes.

These known devices comprise many finely machined parts, usually require an increased hub length and cause difficulties during assembling and maintenance service.

SUMMARY OF THE INVENTION

It is therefore an object of the present invention to provide an improved variable-pitch propeller.

Yet another object is to provide such a propeller which is simple in construction and inexpensive to manufacture.

These objects are attained according to the present invention in a variable-pitch propeller wherein the adjustment menber is not only axially displaceable in the hub, but rotatable in the hub about the hub axis. A link extends generally along the hub axis and has two ends one of which is secured to the adjustment member. Bearing means connects the other end of the link to the pivot for rotation of the link relative to the pivot about the pivot axis of the respective vane with simultaneous limited canting and axial displacement of the link relative to the respective pivot axis. Thus when the adjustment member is axially displaced the vane is rotated about the vane axis. Hereinafter the terms "axially" and "radially" are with reference to the hub axis about which the hollow hub is rotatable unless otherwise specified.

According to further features of this invention the adjustment member is provided with a plurality of integral rigid arms each of which constitutes a respective link.

Thus in accordance with the present invention it is possible for the pivots on the vanes to be forced to orbit around the respective vane axes by means of these links. The bearing permitting limited canting of the pivots relative to the adjustment arms or links allows an extremely simple structure to be used to vary the pitch of the vanes of the propeller. The arm will move axially relative to the pivot axis along the pin constituting the pivot as this pivot orbits limitedly about its respective vane axis.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

DESCRIPTION OF A PREFERRED EMBODIMENT

Figure 1:
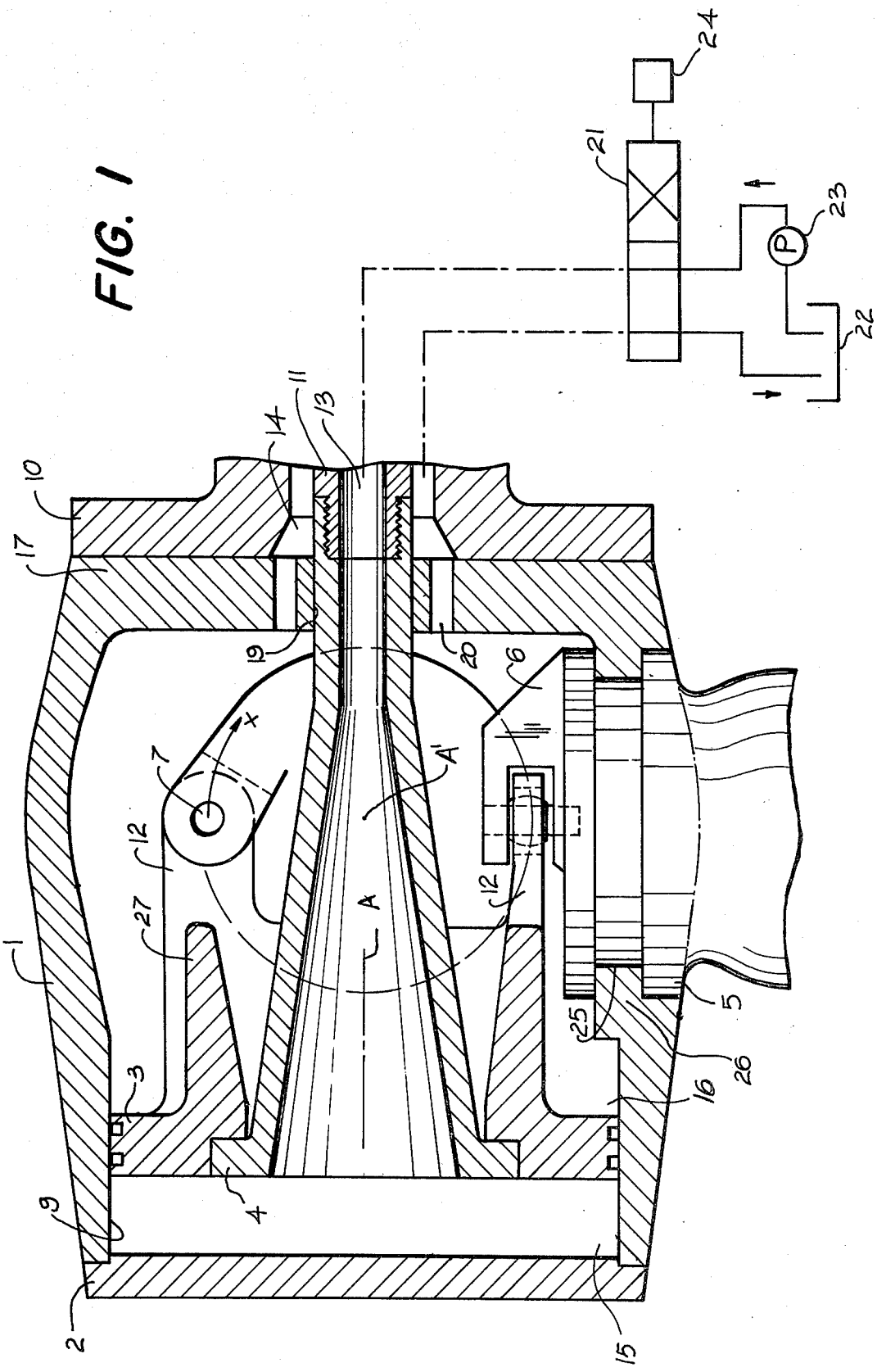
FIG. 1 is an axial section partly in diagrammatic form showing the variable-pitch propeller according to this invention.
Figure 2:
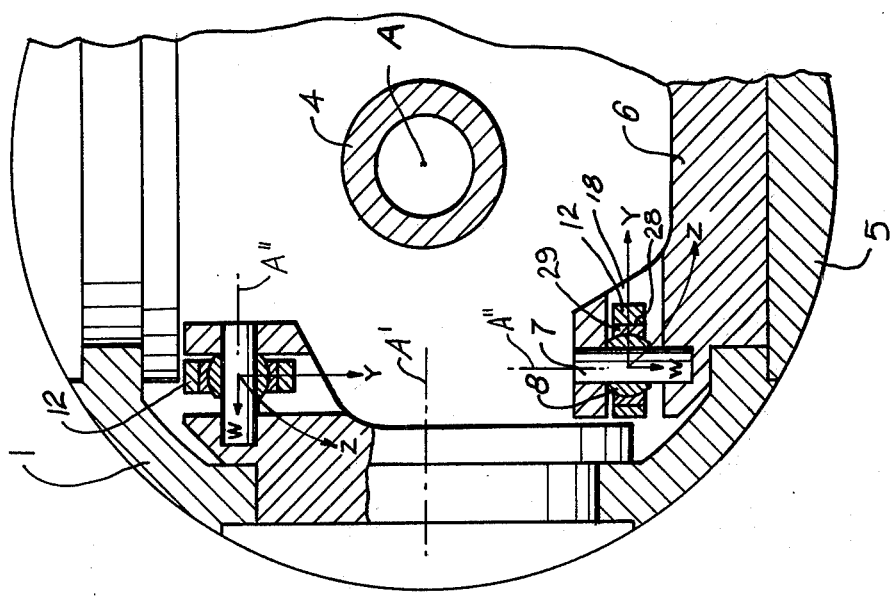
FIG. 2 is a partial cross-sectional view of the arrangement of FIG. 1.

As shown in FIGS. 1 and 2 the variable-pitch propeller according to this invention has a hollow hub 1 rotatable about an axis A and having an end plate 17 secured to a flanged rear end of a propeller shaft 10 which is tubularly hollow. Extending radially relative to the axis A from this hub 1 are four vanes 5 constituted as standard propeller vanes and each having a respective axis A' about which the respective vane can rotate on the hub 1. The axes A' all lie in a common plane orthogonal to the axis A and all intersect at the axis A. Furthermore each of the vanes 5 is formed with an annular groove 25 in which fits a ridge 26 on the respective portion of the hub 1 for easy rotation of the vanes 5 about their axes A'.

The hub 1 is closed at its rear end by means of a removable cover plate 2 extending perpendicular to the axis A. Adjacent this cover 2 the hub 1 is formed internally with a cylindrical surface 9 centered on the axis A. A plate or piston member 3 is axially displaceable in the cylinder portion 9 and subdivides the interior of the housing 1 into a rear compartment 15 and a front compartment 16. A trumpet-shaped pipe 4 has its rear end connected to the piston 3 and its front end threaded on the rear end of a rigid feed pipe 11 extending coaxially up through the hollow propeller shaft 10. The interior 13 of the pipes 4 and 11 therefore communicates with the rear compartment 15 and the passage or space 14 between the pipe 11 and the propeller tube 10 communicates via bores 20 in the end plate 17 with the front compartment 16.

The passages 13 and 14 are connected to one side of a reversing valve 21 whose other side is connected to a reservoir 22 and pump 23. Solenoid 24 can reverse this valve 21 in order to create a pressure differential between the compartments 15 and 16, thereby urging the piston 3 in either axial direction. Such displacement will slide the front cylindrical portion of the feed pipe 4 in a bore 19 formed in the end plate 17. It is noted in this respect that mechanical operation without pressurization of the piston 3 is also possible simply by physically mechanically displacing the pipe 11. Similarly the position of the pipe 11 can be monitored to ascertain at a remote location the position of the vanes 5 as will be described below.

The piston 3 which is of cylindrical shape to match the wall 9 has a cylindrically annular rim 27 from which extends four arms 12 angularly equispaced about the axis A and extending exactly axially. In addition each of the vanes 5 is formed with a flange 6 and extending between the respective flange 6 and the body of the vane 5 is a pivot pin 7 defining a pivot axis A" parallel to the axis A' of the respective vane 5. Thus it is apparent that as each of the vanes 5 rotates about its respective axis A' its respective axis A" will orbit about this axis A'. Slidable along each of these pins 7 is a respective bearing element 8 having a cylindrical central throughgoing bore and a part-spherical outer surface. In addition each of the arms 12 is formed with a throughgoing bore 28 receiving a bearing insert 29 having a cylindrical outer shape corresponding to that of the bore 28 and a part-spherical inner surface fitting around the outer surface of the part 8. Thus it is possible for the part 8 to slide along the pin 7 in the direction of arrow w of FIG. 2. The axial displacement of the bearing parts 8 and 29 is limited to the gap 18 at the central region of the pin 7 between the flange arm 6 and the vane 5.

In use the hub 1 is rotated in the appropriate angular direction about its hub axis A by the propeller shaft 10. In order to change the pitch of the vanes 5, which is determined by the angular position of these vanes 5 about their axes A', the valve 21 is operated so as, for instance, to connect the back chamber 15 to the output of the pump 23 and the front chamber 16 to the reservoir 22. This will force the piston or adjustment member 3 forwardly along the surface 9. The arms 12 will therefore push by means of the bearing parts 29 and 8 on all of the pivot pins 7, causing them to move forwardly relative to the axis A. These pins 7 are nonetheless constrained only to move orbitally so that they will not move, instead, in the direction of arrow x of FIG. 1. Such displacement in the direction of arrow x will, first of all, cause the piston 3 to rotate about the axis A on the surface 9. This displacement in turn will cause the bearing parts 8 and 29 to move both parallel to the axis A' in the direction w and perpendicular to the axis A' in the direction of arrow y. The resultant vector is displacement in the direction of curved arrow z of FIG. 2. Thus the arm 12 will move axially relative to the axis A' in the space 18, with concomitant sliding of the ball 8 along the pin 7.

Such hydraulic actuation of the piston 3 insures continued lubrication of the various bearings and pivots operating the vanes. At the same time the possibility of mechanical actuation allows for emergency control under loss of pressure, and makes monitoring of the pitch of the vanes 5 very easy by using either the angular or axial position of the pipe 11.

It will be understood that each of the elements described above, or two or more together, may also find a useful application in other types of structures differing from the types described above.

While the invention has been illustrated and described as embodied in a variable-pitch propeller, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A variable-pitch propeller comprising:
 a hollow hub rotatable about a hub axis; at least one vane arranged on said hub and rotatable on said hub about a vane axis extending generally radially of said hub axis; a pivot fixed on said vane and defining a pivot axis off-set from and generally parallel to said vane axis; an adjustment member arranged in said hub for displacement parallel to said hub axis and for rotation in said hub about said hub axis; a link extending generally along said hub axis and having two ends one of which is rigidly secured to said adjustment member; self-aligning bearing means slidably supported on said pivot and joining for swivel movement the other end of said link to said pivot to transform axial displacement and rotation of said hub into a rotary movement of said vane about said vane axis; and means for axially displacing and simultaneously rotating said adjustment member in said hub along and about said hub axis and thereby rotating said vane about said vane axis.

2. The propeller defined in claim 1, wherein said adjustment member is formed with a projecting rigid arm constituting said link.

3. The propeller defined in claim 1, wherein said hub has a cylindrical inner wall centered on said hub axis, said adjustment member being slidable and rotatable on said cylindrical inner wall.

4. The propeller defined in claim 3, wherein said adjustment member subdivides the interior of said hub into a pair of axially spaced compartments at said inner wall, said means for displacing including means for pressurizing at least one of said compartments with a fluid.

5. The propeller defined in claim 4, wherein said means for displacing includes a conduit passing through one of said compartments and connected to said adjustment member which is formed at said conduit with a throughgoing aperture, whereby said conduit opens into the other of said compartments.

6. The propeller defined in claim 5, wherein said conduit extends along and is centered on said hub axis, said propeller further comprising a tubular propeller shaft extending along and centered on said hub axis, said conduit being coaxially spaced with said shaft.

7. The propeller defined in claim 6, wherein said conduit is fixed to and axially and angularly displaceable with said adjustment member.

8. The propeller defined in claim 2, wherein said pivot is a pin having two ends one of which is fixed in said vane.

9. The propeller defined in claim 8, wherein said vane is formed with a flange in which the other end of said pin is seated, whereby a central region of said pin is exposed between said vane and said flange, said bearing means engaging said pin in said central region.

10. The propeller defined in claim 9, wherein said bearing means includes a bearing element axially displaceable along said pin and having a part spherical outer surface engaging said arm.

11. The propeller defined in claim 10, wherein said arm is provided with a bearing insert having a part spherical inner surface riding on said outer surface.

12. The propeller defined in claim 1, wherein said adjustment member has a plurality of such arms each connected to a respective such pivot of a respective such vane pivotal about a respective such vane axis, said vane axes being generally angularly equispaced about said hub axis.

13. The propeller defined in claim 12, wherein said adjustment member is formed with an annular rim centered on said hub axis and extending toward said pivots, said arms constituting extensions of said rim and being integral with said adjustment member.

14. The propeller defined in claim 2, wherein said hub is adapted to be mounted on the rear end of a propeller shaft, and has a rear end remote from said shaft, said member being in said rear end.

* * * * *